(12) United States Patent
Underwood et al.

(10) Patent No.: US 8,170,041 B1
(45) Date of Patent: May 1, 2012

(54) MESSAGE PASSING WITH PARALLEL QUEUE TRAVERSAL

(75) Inventors: Keith D. Underwood, Albuquerque, NM (US); Ronald B. Brightwell, Albuquerque, NM (US); K. Scott Hemmert, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1462 days.

(21) Appl. No.: 11/226,092

(22) Filed: Sep. 14, 2005

(51) Int. Cl.
 *H04L 12/28* (2006.01)
(52) U.S. Cl. .................... 370/412; 370/229; 370/235
(58) Field of Classification Search .......... 370/236, 370/392, 394, 250, 252, 350, 412, 413, 414, 370/415, 420, 421, 422, 423, 426, 428, 235, 370/232, 465, 474; 719/313, 321, 328, 312, 719/314, 315, 316; 709/100, 101, 103, 245, 709/313, 314, 315, 318; 395/200.38, 670, 395/672, 674, 375, 650, 800, 200.63, 200.64, 395/200.65, 200.66, 200.67; 375/200.63, 375/200.64, 200.65, 200.66, 200.67, 200.38, 375/670, 672, 674, 375, 650, 800
See application file for complete search history.

(56) References Cited

U.S. PATENT DOCUMENTS

| | | | | |
|---|---|---|---|---|
| 5,185,871 A * | 2/1993 | Frey et al. | ...................... | 712/205 |
| 5,390,312 A * | 2/1995 | Chiarot et al. | ................ | 711/203 |
| 5,455,825 A * | 10/1995 | Lauer et al. | .................... | 370/413 |
| 5,465,335 A * | 11/1995 | Anderson | ..................... | 718/107 |
| 5,678,026 A * | 10/1997 | Vartti et al. | .................... | 711/152 |
| 5,742,812 A * | 4/1998 | Baylor et al. | .................. | 713/169 |
| 5,832,262 A * | 11/1998 | Johnson et al. | ............... | 718/102 |
| 5,878,226 A * | 3/1999 | Benner et al. | ................. | 709/233 |
| 5,931,915 A * | 8/1999 | Benner et al. | ................. | 709/232 |
| 6,377,561 B1 * | 4/2002 | Black et al. | .................... | 370/330 |
| 6,646,991 B1 * | 11/2003 | Drottar et al. | ................. | 370/238 |
| 6,754,223 B1 * | 6/2004 | Lussier et al. | ................ | 370/412 |
| 6,782,537 B1 * | 8/2004 | Blackmore et al. | ........... | 719/313 |
| 7,107,359 B1 * | 9/2006 | Burton et al. | ................. | 709/250 |
| 7,487,511 B2 * | 2/2009 | Stall | ............................. | 719/314 |
| 2002/0129189 A1 * | 9/2002 | Lin et al. | ........................... | 711/1 |
| 2003/0065843 A1 * | 4/2003 | Jones et al. | ................... | 710/107 |
| 2003/0135621 A1 * | 7/2003 | Romagnoli | ................... | 709/226 |
| 2003/0235188 A1 * | 12/2003 | Varma et al. | .................. | 370/379 |
| 2004/0158464 A1 * | 8/2004 | Baker | .......................... | 704/231 |
| 2004/0167897 A1 * | 8/2004 | Kuhlmann et al. | ............ | 707/10 |
| 2004/0202192 A9 * | 10/2004 | Galbi et al. | .................... | 370/412 |
| 2005/0131865 A1 * | 6/2005 | Jones et al. | ........................ | 707/2 |
| 2005/0207436 A1 * | 9/2005 | Varma | ........................... | 370/412 |
| 2006/0072599 A1 * | 4/2006 | Smiljanic | ...................... | 370/412 |
| 2006/0164978 A1 * | 7/2006 | Werner et al. | ................. | 370/229 |
| 2007/0174471 A1 * | 7/2007 | Van Rossum | ................ | 709/229 |
| 2009/0210586 A1 * | 8/2009 | Tanabe | ........................... | 710/52 |
| 2010/0306169 A1 * | 12/2010 | Pishevar et al. | ............... | 707/613 |

OTHER PUBLICATIONS

Roth Brightwell, MPICH on the T3D, 1996, IEEE, pp. 1-9.*
Roth Brightwell, MPICH on the T3D, 1996, IEEE, pp. 1-8.*
Soraya Kasnavi et al, "A Hardware-Based Longest Prefix Matching Scheme for TCAMs", International Symposium on Circuits and Systems (ISCAS), IEEE, May 2005 (4 pages complete).

(Continued)

*Primary Examiner* — Chi Pham
*Assistant Examiner* — Abdullah Riyami
(74) *Attorney, Agent, or Firm* — Scott B. Stahl

(57) ABSTRACT

In message passing implementations, associative matching structures are used to permit list entries to be searched in parallel fashion, thereby avoiding the delay of linear list traversal. List management capabilities are provided to support list entry turnover semantics and priority ordering semantics.

21 Claims, 7 Drawing Sheets

OTHER PUBLICATIONS

"Myrinet Express (MX): A High-Performance, Low-Level, Message-Passing Interface for Myrinet", Version 1.0, Jul. 1, 2005, pp. 1-8.

"Elan Programming Manual", Version 5.2, Quadrics Ltd., Apr. 2005, pp. 2-9 through 2-11, and 3-3.

* cited by examiner

MESSAGE PASSING WITH PARALLEL QUEUE TRAVERSAL

This invention was developed under Contract DE-AC04-94AL85000 between Sandia Corporation and the U.S. Department of Energy. The U.S. Government has certain rights in this invention.

FIELD OF THE INVENTION

The present invention relates generally to data communications and, more particularly, to message passing techniques.

BACKGROUND OF THE INVENTION

Conventional network interface devices provide an applications programming interface (API) that implements message passing (data communication) between nodes. For example, in MPI (Message Passing Interface) implementations, the API supports basic calls such as Send and Receive. The Receive call permits the calling node to specify what message(s) it is willing to receive, and where the message(s) should be stored upon arrival. Conceptually, an MPI implementation has two message queues (also referred to as lists), a posted receive queue and an unexpected message (or simply unexpected) queue. The posted receive queue contains a list of outstanding receive requests, and the unexpected message queue contains a list of messages that have arrived but do not match any previously posted receive requests. Incoming messages traverse the posted receive queue for a possible match, and end up in the unexpected queue if no match is found. Before a receive request can be added to the posted receive queue, the unexpected queue must be searched for a possible match. This search of the unexpected queue is an atomic operation in order to ensure that a matching message does not arrive during the time between the search of the unexpected queue and the posting of the receive request in the posted receive queue.

MPI messages are matched using three fields, namely, a context identifier, a source rank and a message tag. The context identifier represents an MPI communicator object, providing a safe message passing context so that messages from one context do not interfere with messages from other contexts. The source rank represents the local rank of the sending process within the communicator, and the message tag is a user-assigned value that can be used for further message selection within a particular context. A posted receive request must explicitly match the context identifier, but may "wildcard" the source rank and message tag values to match against any value. In addition to these matching criteria, MPI also requires that messages between two nodes in the same context must arrive in the order in which the corresponding sends were initiated.

In prior art MPI implementations, the posted receive queue and the unexpected queue are represented as linear lists. Accordingly, the time required to traverse the queues increases linearly with the lengths of the lists. In applications that include parallel processes, the lengths of the lists can grow linearly with the number of parallel processes. In some networks, the time spent traversing an arbitrarily long queue may impact the entire system, because the network interface may be unable to service any other requests during the search. This can lead to a situation where a poorly written or erroneous application can affect the performance of other applications in the system. The time required to find a matching entry can be reduced by using hash tables, but the use of hash tables increases the time required to insert an entry into the list.

Prior art approaches have used network interface hardware specifically for MPI. For example, a general purpose processor (in some cases implemented by several individual processors) embedded within a network interface chip (NIC) can run a user-context thread to process incoming messages. In this approach, much of the protocol processing needed to support MPI can occur on the network interface. However, the embedded processor manages the queues as linear lists. In the Red Storm supercomputer, the network interface chips implement the Portals programming interface, which provides protocol building blocks that support general network functionality and MPI. However, incoming messages traverse a linear list in Portals. Other approaches attempt to use the network interface to implement MPI collective operations efficiently. These approaches focus on protocol optimizations and efficient data movement operations.

It is desirable in view of the foregoing to provide message passing implementations with list traversal capabilities that avoid the delays associated with linear list traversal. Exemplary embodiments of the present invention utilize associative matching structures which permit list entries to be searched in parallel fashion, thereby avoiding the delay of linear list traversal. List management capabilities are provided to support list entry turnover and priority ordering semantics.

DETAILED DESCRIPTION

Common MPI implementations in network interface chips according to the prior art include DMA facilities for sending (Tx) and receiving (Rx) communications. These DMA facilities are coupled to the network through logical FIFO interfaces that provide buffering capability. An embedded processor, together with a local SRAM and a local bus, manages transactions to and from the network, and various other housekeeping tasks. The embedded processor manages both the posted receive queue and the unexpected queue as linearly searchable lists. As used herein, MPI can refer to any data communication techniques that include MPI techniques or are functionally or operationally compatible with MPI techniques. Moreover, although exemplary embodiments of the invention are described herein in the context of MPI implementations, it will be understood by workers in the art that the principles of the invention are generally applicable to other APIs that may be implemented by network interface devices and are capable of implementing MPI requirements and semantics similar to MPI.

Figure 1:
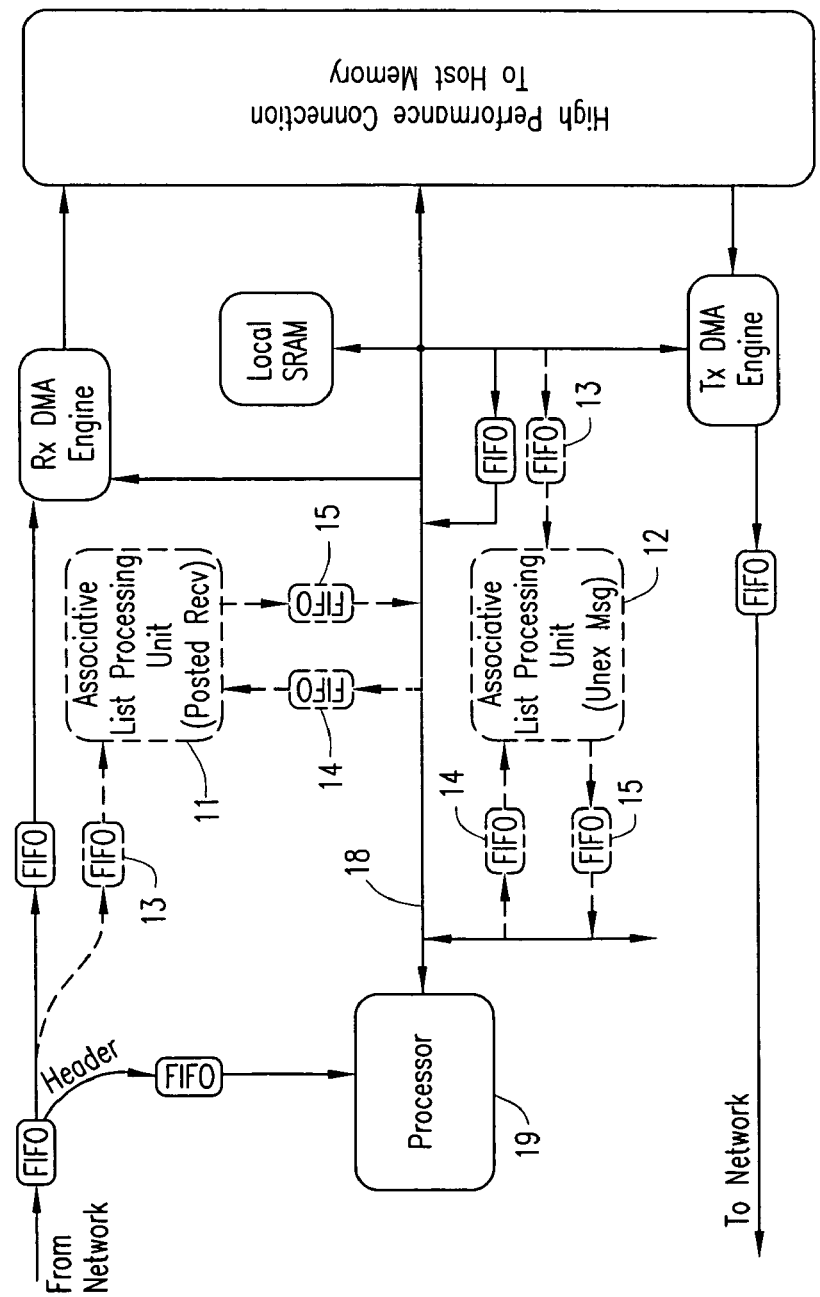
FIG. 1 diagrammatically illustrates a network interface apparatus including associative list processor units (ALPUs) according to exemplary embodiments of the invention.

Exemplary embodiments of the present invention improve upon prior art architecture by providing associative matching structures that permit posted receive queues and unexpected queues to be searched in parallel fashion. List management capabilities are provided to support list entry turnover and MPI ordering semantics. FIG. 1 illustrates exemplary embodiments of a network interface apparatus including associative matching structures which support posted receive queues and unexpected queues according to principles of the invention. The associative matching structures are designated by broken line in FIG. 1. In some embodiments, the remainder of the architecture of FIG. 1 is generally similar to the aforementioned embedded processor implementations utilized in prior art network interface chips, except for the embedded processor's capabilities of interfacing with the associative matching structures. Examples of the interfacing capabilities of the embedded processor are described in detail hereinbelow.

The exemplary embodiments shown in FIG. 1 include two associative matching structures, one for implementing a posted receive queue (or list), and one for implementing an unexpected queue. Each associative matching structure includes an associative list processing unit (ALPU) and three FIFOs for transferring information to and from the ALPU. The ALPU 11 implementing the posted receive queue receives copies of incoming header information (from the network) via an associated request FIFO 13, and the ALPU 12 implementing the unexpected queue receives copies of new receive requests (from the host) via its associated request FIFO 13. Each ALPU also receives commands from the embedded processor 19 via the local bus 18 and an associated control FIFO 14, and provides results/responses to the processor via the local bus and an associated result FIFO 15. The FIFOs at 13-15 permit the ALPUs 11 and 12 to interact with their environment in decoupled, asynchronous fashion.

Figure 2:
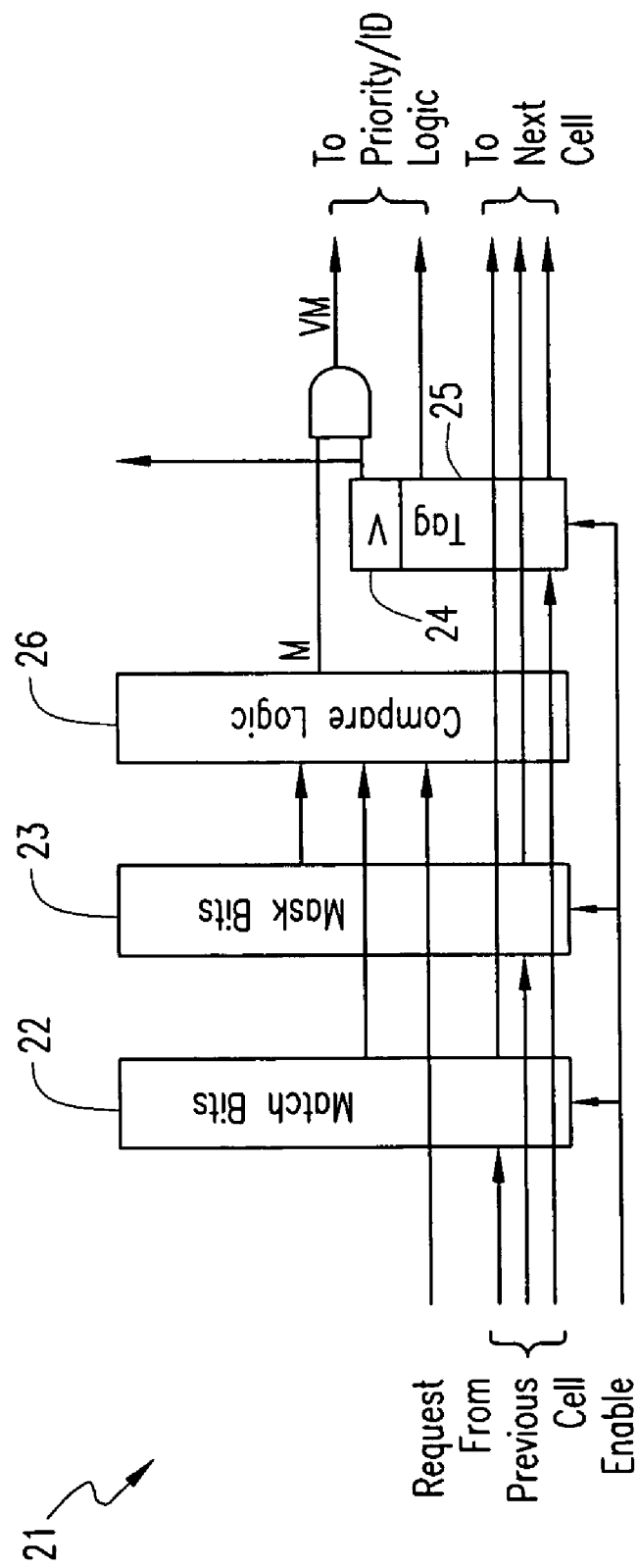
FIG. 2 diagrammatically illustrates a base cell of one ALPU of FIG. 1 according to exemplary embodiments of the invention.

FIG. 2 diagrammatically illustrates a base cell 21 of the posted receive ALPU 11 of FIG. 1 according to exemplary embodiments of the invention. This base cell is used to implement a single entry in the posted receive queue. The cell 21 contains storage 22 for the set of bits being matched (i.e., the MPI matching information), and storage 23 for a corresponding set of mask bits (for wildcard bits within MPI). In various embodiments, the set of mask bits can range from a pair of bits (one each for the two fields in an MPI_Irecv that can be wildcarded) to a full width mask, as is needed, for example, by the Portals interface. The base cell also includes storage 24 for a valid bit V which indicates whether or not the entry is valid, and storage 25 for a tag field.

In some embodiments, the tag field stored at 25 is a discretionary field that can be used as desired by the software. This tag field is not the same as the so-called MPI tag, the latter being a part of the aforementioned MPI matching information stored at 22. For example, the tag field stored in a given cell can be a pointer that points directly to a location in local RAM that corresponds to the entry represented by that cell. Compare logic 26 compares the stored match bits to the MPI matching information contained in the posted receive request input, factoring in the set of stored mask bits as "don't care" bit locations. The compare logic 26 produces as its output a single match indicator bit M.

In some embodiments, the base cell 21 provides three output signals: the valid bit V; a further bit VM, which is the logical AND of the valid bit V and the match indicator bit M; and the tag field. The bit VM ensures that only a valid entry in the queue can produce a valid match indication. The valid bit V can be controlled as desired, and can provide the capability of preventing any selected cell from producing a valid match.

Some embodiments do not utilize the validity check feature provided by the bits V and VM, but rather use the match indicator bit M alone to indicate a valid match. The tag field is routed through priority logic which selects the correct match, as described in more detail hereinbelow. The stored data, namely, the match bits, the mask bits and the tag field, can be received from the immediately previous (next lowest priority) cell and passed to the immediately succeeding (next highest priority) cell in the posted receive queue.

Figure 3:
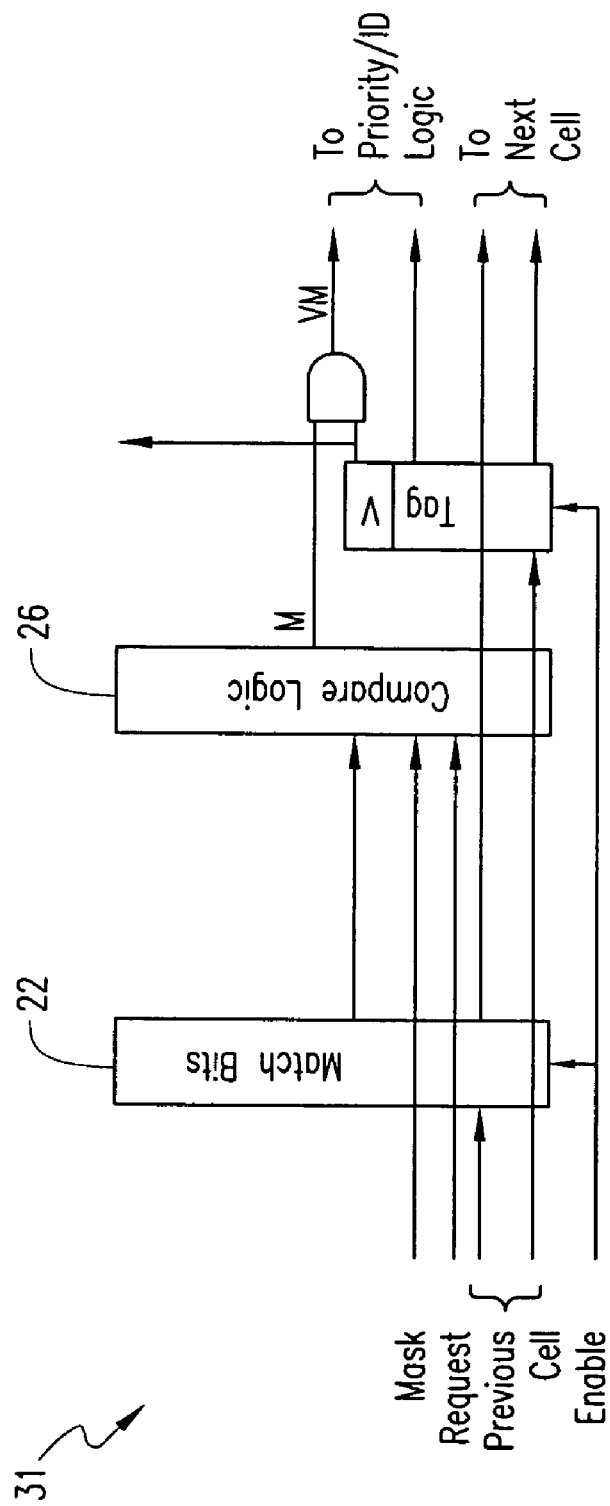
FIG. 3 diagrammatically illustrates a base cell of the other ALPU of FIG. 1 according to exemplary embodiments of the invention.

FIG. 3 diagrammatically illustrates a base cell 31 of the unexpected message ALPU of FIG. 1 according to exemplary embodiments of the invention. This base cell is used to implement a single entry in the unexpected message queue. The cell 31 of FIG. 3 does not store mask bits, but rather receives mask bits together with requests, as an input. In some embodiments, except for receiving the mask bits as an input, the cell 31 is otherwise structurally and functionally the same as the cell 21 of FIG. 2.

Figure 4:
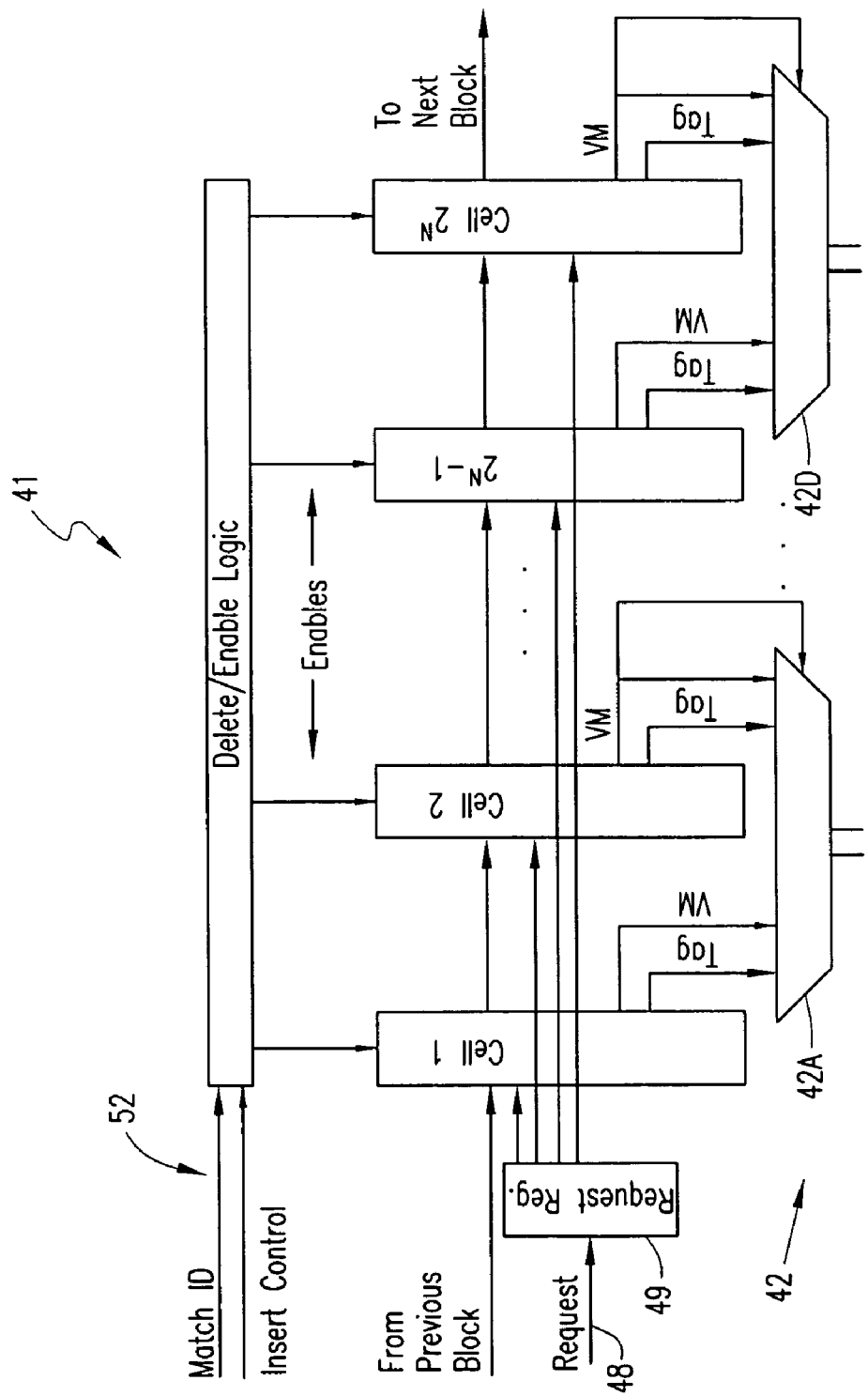
FIGS. 4-4B diagrammatically illustrate a cell block arrangements including a plurality of the base cells of FIG. 2 or FIG. 3, according to exemplary embodiments of the invention.
Figure 4A:
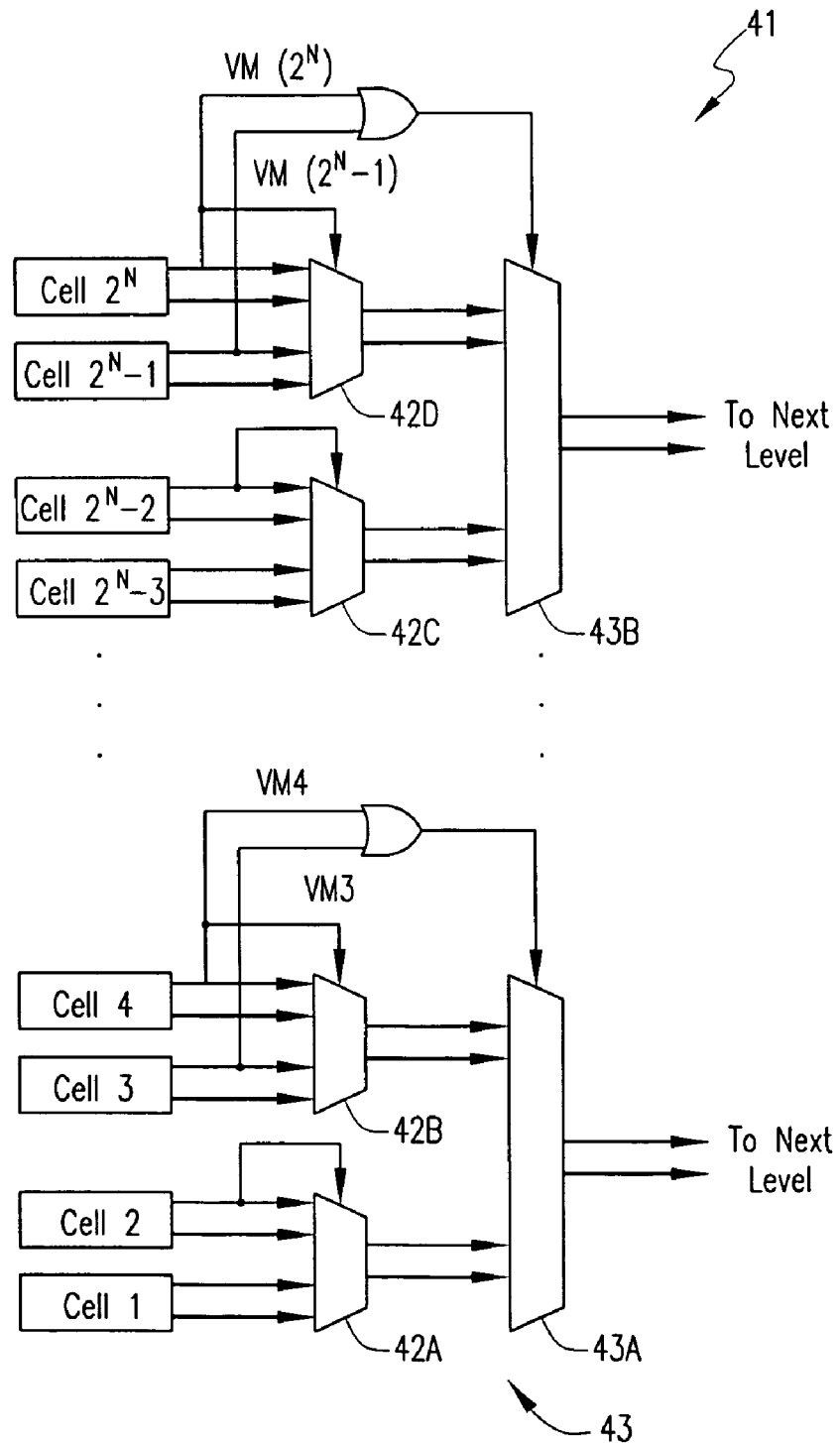

FIGS. 4 and 4A diagrammatically illustrate a cell block arrangement 41 including a plurality of the base cells of FIG. 2 or FIG. 3 according to exemplary embodiments of the invention. In some embodiments of the ALPUs according to the invention, the queue is implemented by a plurality of cell block arrangements 41 (as illustrated generally in FIG. 5) connected among one another so that a given entry can be transferred from the highest priority cell in one cell block to the lowest priority cell in the immediately succeeding (next highest priority) cell block. In addition to the plurality of base cells (21 for the posted receive queue, 31 for the unexpected message queue), the cell block arrangement 41 of FIGS. 4 and 4A includes a register 49 for holding the incoming request 48, flow control logic to control the flow of data through the cells, prioritization logic to prioritize the tag fields and select the tag field of the proper matching entry, and identification logic to generate a matching entry cell identifier which identifies the cell where the matching queue entry is found. The request register 49 helps to facilitate timing in the operation of the cell block arrangement 41, but is omitted in some embodiments.

The flow control logic drives a separate enable signal to each cell. Each enable signal permits the corresponding cell to receive stored data (i.e., the entry) from the previous cell. The transfer of data from one cell to the next in the queue is enabled in two circumstances: (1) when a valid match occurs; and (2) when a new entry is being added to the queue. When a valid match occurs, MPI semantics require deletion of the matched entry from the queue. In some embodiments, when a valid match occurs, the aforementioned matching entry cell identifier is broadcast to the flow control logic of each cell block 41 (see also FIG. 5). The flow control logic within the cell blocks collectively activate the appropriate enable signals to enable (1) the cell identified by the matching entry identifier, and (2) all previous (lower priority) cells in the queue before the matching cell. Under this configuration of activated enable signals, the entries in all cells of lower priority than the matching cell can be shifted by one cell toward the matching cell, but no other cell-to-cell transfer of entries can occur, which effectively deletes the entry in the matching cell, and leaves at least the first (lowest priority) cell in the queue empty. Any empty cell(s) at the lower priority end of the queue can be considered to be available to receive new entry insertion(s). During insertion of a new entry, an empty cell at the lower priority end of the queue can be enabled to receive the entry.

Considering any given cell in the queue that is not empty, that non-empty cell will not be enabled during an insertion, unless there is available space in the queue to receive and store that cell's contents (i.e., its entry). In various embodiments, available space refers to at least one empty cell of higher priority than the non-empty cell, located either in the same cell block as the non-empty cell, or in a higher priority cell block. In some embodiments, if the queue contains available space of higher priority than a given group of non-empty cells, then all of those non-empty cells can be enabled during inserts. This can help to eliminate the higher priority available space (which may have occurred during inserts if there was time between insertion of new entries).

In some exemplary embodiments, the prioritization logic is designed for a cell block arrangement wherein the number of cells is a power of 2, as shown in FIGS. 4 and 4A, and the prioritization logic is correspondingly based on a plurality of 2-to-1 multiplexers arranged in a tree configuration. In various other embodiments, the number of cells per cell block is other than a power of 2, and/or multiplexers of sizes other than 2-to-1 are used. In FIGS. 4 and 4A, cell 1 is the lowest priority cell in the queue and defines the low priority end of the queue, cell $2^N$ is the highest priority cell in the queue and defines the high priority end of the queue. The cells designated as cell 2 through cell $2^N-1$ have respective priorities in the queue that define incremental priority increases from the priority of cell 1 to the priority of cell $2^N$.

At the input end (lowest level) of the exemplary multiplexer tree shown in FIGS. 4 and 4A, each multiplexer of a group of first-level 2-to-1 multiplexers 42 has a first data input coupled to receive the VM output and the tag field output from a first base cell (e.g., cell 1 or cell $2^N-1$), and has a second data input coupled to receive the VM and tag field outputs from a second base cell (e.g., cell 2 or cell $2^N$). The first base cell associated with each first-level multiplexer at 42 (e.g., cell 1 or cell $2^N-1$) is one entry lower in queue priority than the second base cell associated with that multiplexer (e.g., cell 2 or cell $2^N$).

As shown in FIGS. 4 and 4A, each of a group of second-level 2-to-1 multiplexers at 43 has a first data input fed by the output of a first one (e.g., 42A or 42C) of the first-level multiplexers, and has a second data input fed by the output of a second one (e.g., 42B or 42D) of the first-level multiplexers. The first base cell (e.g., cell 1 or cell $2^N-3$) and the second base cell (e.g., cell 2 or cell $2^N-2$) associated with the first one (e.g., 42A or 42C) of the first-level multiplexers are, respectively, two entries and one entry lower in queue priority than the first base cell (e.g., cell 3 or cell $2^N-1$) associated with the second one (e.g., 42B or 42D) of the first-level multiplexers. This pattern continues through N levels, with each multiplexer at the next higher level having its data inputs driven by the data outputs of two corresponding multiplexers from the level immediately below it. To support prioritization and match selection among $2^N$ cells, there are $2^{N-1}$ first-level multiplexers at 42, $2^{N-2}$ second-level multiplexers at 43, and so on, up to a single multiplexer at the Nth (output) level of the tree (see 57 in FIG. 5).

According to MPI semantics, the highest priority matching entry in the list is considered to be the "correct" matching entry. The prioritization logic uses the VM bits to select the tag field of the "correct" matching entry. At each of the first-level multiplexers 42, the VM bit of the higher priority base cell (e.g., cell 2 or cell $2^N$ in FIGS. 4 and 4A) is used to control the multiplexer's selection. If the VM bit of the higher priority base cell is active (logic 1 for positive logic), then the multiplexer will select and output the tag field and VM bit from the higher priority cell. If the VM bit of the higher priority base cell is inactive (logic 0 for positive logic), then the multiplexer will select and output the tag field and VM bit from the lower priority cell.

To control each of the second-level multiplexers 43, the VM bits from the associated higher order pair of base cells are logically ORed. As shown in FIG. 4A, for example, VM bits designated as VM3 and VM4, produced by cell 3 and cell 4, respectively, are logically ORed to produce the selection control signal for multiplexer 43A. Similarly, VM bits designated as VM($2^N-1$) and VM($2^N$), produced by cell $2^N-1$ and cell $2^N$, respectively, are logically ORed to produce the selection control signal for multiplexer 43B. Continuing with the example of positive logic, if the result of the OR operation is logic 1, then the path from the higher order pair of base cells (e.g., cell 3/cell 4 from multiplexer 42B, or cell $2^N-1$/cell $2^N$ from multiplexer 42D) is selected by the multiplexer 43. Otherwise, the multiplexer 43 selects the path from the lower order pair of base cells (e.g., cell 1/cell 2 from multiplexer 42A, or cell $2^N-3$/cell $2^N-2$ from multiplexer 42C). For controlling each multiplexer of each of the successively higher levels in the multiplexer tree, the VM bits from the highest order pair of base cells feeding that multiplexer are logically ORed, and the result is used to control the multiplexer in the same manner described above with respect to the second-level multiplexers 43.

Figure 5:
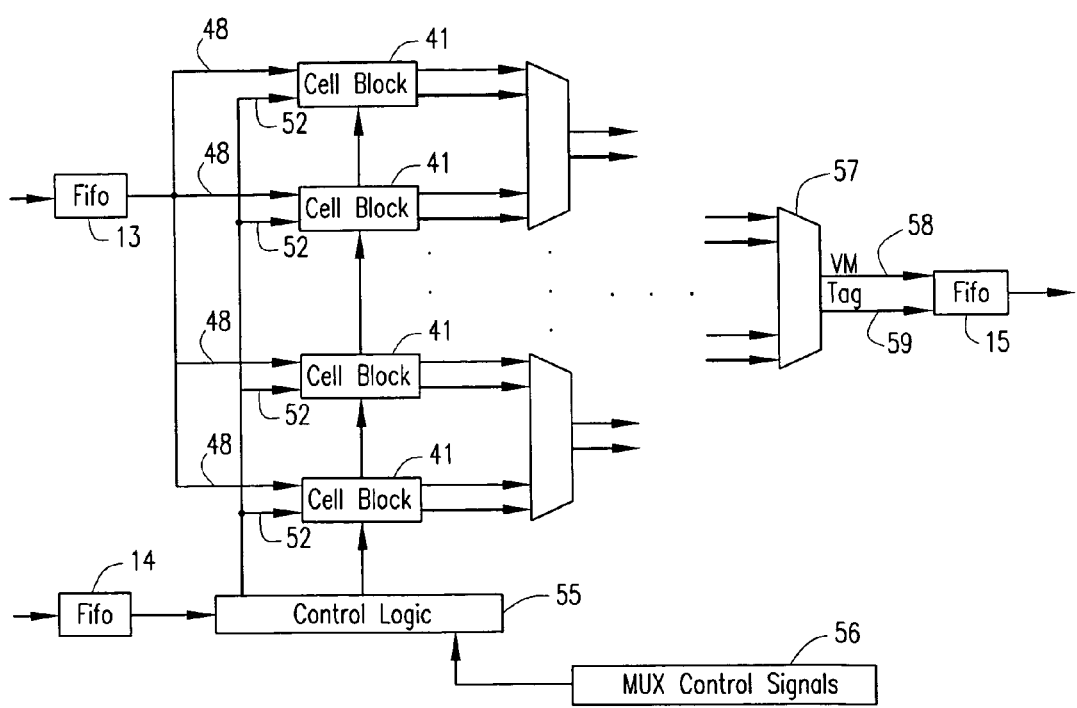
FIG. 5 diagrammatically illustrates a plurality of cell block arrangements combined to form the ALPUs of FIG. 1.

FIG. 5 diagrammatically illustrates exemplary embodiments of the ALPU, wherein a plurality of the cell blocks 41 of FIGS. 4 and 4A (or 4B as described below) are chained together, and control logic 55 interfaces the ALPU to the rest of the network interface. The arrangement of FIG. 5 continues the multiplexer tree prioritization of FIGS. 4 and 4A by simply processing the outputs of the cell blocks 41 in the same manner as described above with respect to FIGS. 4 and 4A. Effectively, several cell blocks 41 are combined to create one large array of cells.

In some embodiments, all of the above-described multiplexer control signals can be registered, as shown at 56 in FIG. 5. These registered multiplexer control signals uniquely identify the cell that is the source of the tag field and VM bit that survive at the output of the Nth multiplexer 57. If the surviving VM bit 58 is active, then the surviving tag field 59 is the desired matching entry, and the control logic 55 can determine, based on the contents of register 56, the identity of the cell that contains the matching entry. This cell identity information can be broadcast to all of the cell blocks at 52, for use in deletion of the matching entry from the identified cell. If the surviving VM bit 58 is not active, then a match has not been found.

Figure 4B:
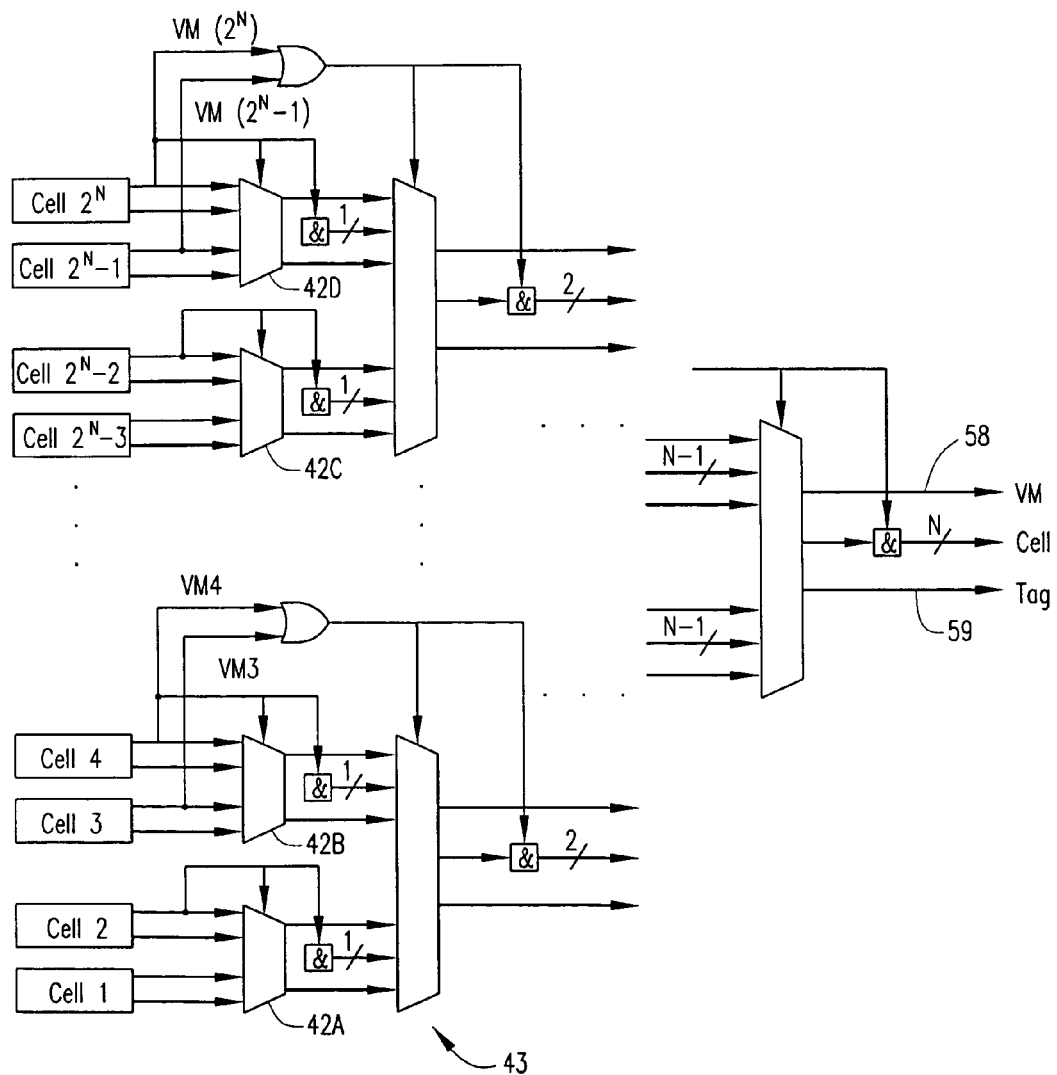

FIG. 4B diagrammatically illustrates further exemplary embodiments of a cell block arrangement according to the invention. In the embodiments of FIG. 4B, an N-bit matching entry cell identifier (designated as "cell" in FIG. 4B) is built up within the multiplexer tree. At each level of multiplexing, there are three outputs: valid, cell, and tag. The valid and tag values are simply multiplexed from the previous stage. The cell value is the concatenation of the previous (multiplexed) cell value and the select bit for that level of multiplexing. The select bit is concatenated as the top bit of the new cell value, thus making the cell number grow at each level of multiplexing. The first level of multiplexers has no cell input, only a cell output which corresponds to the select bit for the first level multiplexer. In some embodiments, the matching entry cell identifier ("cell") from the output of the top level multiplexer of FIG. 4B is provided directly to the logic 55 of FIG. 5, without being stored in a register such as register 56.

It can be seen from the foregoing description that exemplary embodiments of the invention provide an associative matching structure for implementing posted receive queues and unexpected message queues that are capable of receiving a search request, searching the queue entries in parallel fashion, and also complying with MPI semantics that require highest priority matching and deletion of matched entries.

Referring again to FIGS. 1 and 5, the control logic 55 controls the interaction of the ALPU with the remainder of the NIC. This control logic determines when new data is taken from the header input, when match searches begin, when data is written to the output, when input commands are read, and how much space is available on the ALPU. Each of the ALPUs receives a pertinent match request, header data from arriving messages for the posted receive ALPU, and receive requests from the host for the unexpected message ALPU. In some embodiments, the embedded processor also receives copies of all match requests received by the ALPUs. The ALPU quickly determines whether there is a valid match, and if so, provides to the embedded processor an index (e.g., the tag field) into a list maintained by the embedded processor. If there is no valid match, then the processor must decide what to do with the non-matching request, as described in more detail hereinbelow.

In some embodiments, each ALPU can be controlled by a set of input commands received from the processor via the associated command FIFO. The command set includes a START INSERT command, an INSERT command, a STOP INSERT command and a RESET command. Each ALPU uses the associated result FIFO to output to the processor any one of a set of response messages. The response message set includes a START ACKNOWLEDGE response, a MATCH SUCCESS response and a MATCH FAILURE response. The RESET command instructs the ALPU to clear all of its entries. The INSERT command instructs the ALPU to insert a new entry into the queue. As such, the INSERT command includes information to be stored in the queue, namely, match bits, mask bits (if needed), and a user-defined tag field. The START INSERT command instructs the ALPU to enter an insert mode where the ALPU accepts and responds to INSERT commands, and the STOP INSERT instructs the ALPU to exit the insert mode. The START ACKNOWLEDGE response is returned by the ALPU to indicate that the ALPU has entered the insert mode. The START ACKNOWLEDGE response also indicates the number of cells within the ALPU that are currently empty. The processor will not issue an INSERT command until it receives from the ALPU a START ACKNOWLEDGE response to a corresponding START INSERT command previously issued by the processor. Once the processor receives the START ACKNOWLEDGE response, the processor can then use the INSERT command to insert entries.

The ALPU returns a MATCH SUCCESS response whenever an input request matches an entry in the ALPU. The MATCH SUCCESS response also includes the tag field from the matching entry. The ALPU returns a MATCH FAILURE response whenever an input request fails to match any of the entries in the ALPU. In some embodiments, a MATCH SUCCESS response can be issued at any time, and a MATCH FAILURE can be issued at any time except during time periods beginning with the issuance of a START ACKNOWLEDGE response and ending with the issuance of a STOP INSERT command. In some embodiments, while in the insert mode, the ALPU permits matches to occur as usual, but holds all requests that fail to match, and retries those failed requests after exiting the insert mode. The processor's handling of MATCH SUCCESS and MATCH FAILURE responses is described in detail hereinbelow.

To facilitate the ability of the processor to manage the MPI queues implemented by the ALPUs, some embodiments use an appropriate set of heuristics. A typical MPI queue can, at times, contain tens or hundreds of entries. At other times, the queue can be quite short. Because the use of an ALPU incurs an overhead penalty, some embodiments use the processor to implement each queue as a linearly searchable list in generally conventional fashion, unless/until the queue becomes long enough to justify the overhead associated with using the corresponding ALPU. In some embodiments, the processor attempts to accumulate a group of new entries before issuing the START INSERT command, so that the entire group of new entries can be inserted during a single instance of the ALPU's insert mode. This reduces the overhead penalty that would otherwise be incurred by inserting the same number of new entries in more piecemeal fashion, such as inserting only one (or a few) new entries per instance of the ALPU's insert mode.

In some embodiments, the processor maintains its own versions of the posted receive queue and the unexpected queue. This permits the ALPU to return in the MATCH SUCCESS response a simple pointer (the user-defined tag field) that points to the entry in the processor's version of the queue. As entries are matched in (and thus deleted from) the ALPU, the processor also deletes its copies of the matched entries. Upon initialization for operation, each ALPU is empty. When entries that require queuing (posted receive requests from the host and unexpected messages from the network) arrive at the network interface, the processor begins to build its own versions of the posted receive and unexpected message queues in memory, implemented in generally conventional fashion as linearly searchable lists. When the length of either queue reaches a threshold, the processor issues a START INSERT command to the appropriate ALPU. In some embodiments, the thresholds are, for example, 5 entries for the posted receive queue and 70 entries for the unexpected message queue. In response to the START INSERT command issued by the processor, the ALPU issues the START ACKNOWLEDGE response, and enters the insert mode. As indicated previously, while the processor is awaiting a START ACKNOWLEDGE response from the ALPU, the processor may still receive from the ALPU one or more MATCH SUCCESS or MATCH FAILURE responses. In some embodiments, the processor may continue to drain such MATCH SUCCESS or MATCH FAILURE responses from the result FIFO until the START ACKNOWLEDGE is received.

As described above, the START ACKNOWLEDGE command indicates the number of cells that are currently empty. In some embodiments, the processor will not execute the insert operation if the number of empty cells is considered to be too small, for example, less than a number of entries that the processor has accumulated for insertion as a group. When the processor determines that an insert operation should proceed, the processor will issue INSERT commands appropriately to complete the desired number of insertions. In some embodiments, if many entries are being inserted, the processor periodically clears the ALPU's result FIFO to ensure that it will not become completely filled by MATCH SUCCESS responses that can occur during the insert operation.

In some embodiments, every request that arrives from the network or the host is received by the processor and the appropriate ALPU. For each request, the processor expects to receive from the ALPU corresponding response, either a MATCH SUCCESS response or a MATCH FAILURE response. If the ALPU returns a MATCH SUCCESS response, then the processor can, in some embodiments, use the tag field to point directly to the matching entry in the processor's copy of the queue. The processor's copy of the queue can, in some embodiments, contain the actual address of the memory location where the host wants the corresponding message to be stored, so the processor can then cooperate with the receive (Rx) DMA engine (see FIG. 1) in conventional fashion to initiate and execute a suitable DMA operation to store the message in the desired memory location.

If the posted receive ALPU returns a MATCH FAILURE response, then the processor inserts into the unexpected message queue an entry corresponding to the message, because the message has not been matched in the posted receive queue. If the unexpected message ALPU returns a MATCH FAILURE response, then the processor inserts into the posted receive queue an entry corresponding to the posted receive, because the posted receive has not been matched in the unexpected message queue.

In some embodiments, if the ALPU returns a MATCH FAILURE response, the processor uses conventional linear searching techniques to search any entries in its own version of the corresponding queue that have not yet been inserted into the ALPU. For example, while still accumulating a group of entries that will eventually be inserted into the ALPU during a single instance of the ALPU's insert mode, the processor may have already individually inserted into its own version of the queue each of the entries that it has already accumulated. For each queue, the processor can, for example, maintain a pointer that indicates, at any given time, which entries in the processor's version of the queue have not yet been inserted into the corresponding ALPU. If the processor searches those entries of its own version of the queue that are not present in the corresponding ALPU, and does not find a matching entry among the searched entries, then the processor can take the same appropriate action described above with respect to the receipt of MATCH FAILURE responses from the posted receive and unexpected message ALPUs.

Some embodiments provide increased operating speed by registering the outputs of various stages of the above-described operations (not explicitly shown in FIGS. 1-5). For example: (1) each block of cells can register its own copy of all global signals associated with a new request; (2) the VM bit output by each cell can be registered; (3) the output of the prioritization logic in each cell block can be registered; (4) the output of the overall ALPU prioritization logic can be registered; and (5) each cell block can register its own copy of the matching cell identifier; and (6) deletion of the matched entry can be performed during the next clock cycle after the matching cell identifier is registered in the cell blocks. In some embodiments, items (1) and (6) can be executed in temporally overlapping fashion, such that a new request can be fanned out to the cell blocks while the last-matched entry is being deleted.

The following information is provided to illustrate some specific details of various selected exemplary embodiments of the invention. The ALPU's contain 128 cells in some embodiments, and contain 256 cells in other embodiments. The cell blocks contain 8 cells in some embodiments, 16 cells in other embodiments, and 32 cells in other embodiments. Some embodiments support up to 42 matching bits and up to 16 tag field bits. Various embodiments support a number of mask bits within a range from two bits to a number of bits equal to the number of matching bits supported.

It will be apparent to workers in the art that the exemplary embodiments of the invention described herein can be readily implemented by suitable modifications in the hardware and software of conventional network interfaces that support message passing, for example, network interface chips.

Although exemplary embodiments of the invention are described above in detail, this does not limit the scope of the invention, which can be practiced in a variety of embodiments.

What is claimed is:

1. An apparatus for supporting message passing, comprising:
    an input that receives from a requesting source a request associated with a message;
    an information storage apparatus that stores a prioritized queue of entries;
    an associative matching apparatus coupled to said input and said storage apparatus, said associative matching apparatus configured for searching said prioritized queue of entries in parallel to determine whether any of said entries matches predetermined information in the request, wherein said associative matching apparatus is configured to identify, in parallel with said searching, one of said entries whose priority in said prioritized queue is highest among a plurality of said entries determined to match said predetermined information, and wherein said associative matching apparatus is configured to provide a data path for routing, from said prioritized queue to the requesting source, at least a portion of an entry of said prioritized queue that matches said predetermined information.

2. The apparatus of claim 1, wherein said associative matching apparatus includes prioritization logic that identifies said one entry and selects at least a portion thereof for routing on said data path.

3. The apparatus of claim 2, wherein said associative matching apparatus includes identification logic that identifies a position of said one entry in the queue.

4. The apparatus of claim 3, including control logic coupled to said identification logic and said storage apparatus, said control logic removing said one entry from the queue in response to said identification logic.

5. The apparatus of claim 4, wherein said control logic also reconfigures the queue such that an empty position in the queue created by said removal of said one entry is relocated within the queue to become a lowest priority position of the queue which is available to receive a new entry into the queue.

6. The apparatus of claim 5, wherein said prioritization logic is coupled to said identification logic, and said identification logic produces signals that control said prioritization logic.

7. The apparatus of claim 3, wherein said prioritization logic is coupled to said identification logic, and said identification logic produces signals that control said prioritization logic.

8. The apparatus of claim 2, wherein said prioritization logic includes a multiplexer tree.

9. The apparatus of claim 8, wherein the queue consists of $2^N$ entries, and said multiplexer tree includes N levels of multiplexers.

10. The apparatus of claim 8, wherein said multiplexer tree includes a plurality of multiplexers having a respectively corresponding plurality of multiplexer control inputs, said associative matching apparatus including identification logic that identifies a position of said one entry in the queue, said identification logic coupled to said multiplexer control inputs.

11. The apparatus of claim 1, wherein said associative matching apparatus includes identification logic that identifies a position of said one entry in the queue.

12. The apparatus of claim 11, including control logic coupled to said identification logic and said storage apparatus, said control logic removing said one entry from the queue in response to said identification logic.

13. The apparatus of claim 12, wherein said control logic also reconfigures the queue such that an empty position in the queue created by said removal of said one entry is relocated within the queue to become a lowest priority position of the queue which is available to receive a new entry into the queue.

14. A network interface apparatus that supports message passing between a data network and a host data processing apparatus, comprising:
- a network input that receives messages from the data network;
- a host input that accepts from the host data processing apparatus receive requests respectively indicative of messages that the host data processing apparatus expects to receive from the data network;
- an information storage apparatus coupled to said host input and said network input and configured to stores a first prioritized queue of entries that are respectively associated with receive requests received from the host data processing apparatus and a second prioritized queue of entries that are respectively associated with messages received from the data network; and
- an associative matching apparatus coupled to said network input and said host input and said storage apparatus, said associative matching apparatus responsive to a message from the data network for searching said first prioritized queue of entries in parallel to determine whether any of said entries thereof matches predetermined information in the message, and said associative matching apparatus responsive to a receive request from the host for searching said second prioritized queue of entries in parallel to determine whether any of said entries thereof matches predetermined information in the receive request;
- wherein, if a plurality of said entries of one of said first and second prioritized queues match the associated predetermined information, the associated parallel searching identifies one of said plurality of entries whose priority in said one prioritized queue is highest.

15. The apparatus of claim 14, provided as a network interface chip.

16. A method for supporting message passing, comprising:
- receiving from a requesting source a request associated with a message;
- maintaining a prioritized queue of entries;
- searching said prioritized queue of entries in parallel with digital logic circuitry to determine whether any of said entries matches predetermined information in the request;
- identifying, with the digital logic circuitry and in parallel with said searching, one of said entries whose priority in said prioritized queue is highest among a plurality of said entries determined to match said predetermined information; and
- providing a data path through the digital logic circuitry for routing, from said prioritized queue to the requesting source, at least a portion of an entry of said prioritized queue that matches said predetermined information.

17. The method of claim 16, including selecting at least a portion of said one entry for routing on said data path.

18. The method of claim 17, including identifying a position of said one entry in the queue.

19. The method of claim 18, including removing said one entry from the queue in response to said identifying said position.

20. The method of claim 19, including reconfiguring the queue such that an empty position in the queue created by said removing is relocated within the queue to become a lowest priority position of the queue which is available to receive a new entry into the queue.

21. The apparatus of claim 1, provided as an MPI apparatus.

* * * * *